United States Patent [19]
Grundstrom et al.

[11] Patent Number: 5,999,346
[45] Date of Patent: Dec. 7, 1999

[54] LASER ADJUSTMENT MECHANISM

[75] Inventors: Douglas R. Grundstrom; Mark D. Brinkerhoff, both of San Jose, Calif.

[73] Assignee: Zircon Corporation, Campbell, Calif.

[21] Appl. No.: 09/134,156

[22] Filed: Aug. 14, 1998

[51] Int. Cl.[6] .................................. G02B 7/02; H01S 3/08

[52] U.S. Cl. ............................................ 359/822; 372/107

[58] Field of Search ..................................... 359/811, 819, 359/822; 372/107; 378/195, 196

[56] References Cited

U.S. PATENT DOCUMENTS 5,479,201  12/1995  Sugiura et al. ......................... 347/257
5,825,562  10/1998  Lai et al. ............................... 359/822

OTHER PUBLICATIONS

Empire Level Mfg. Corp., "Top Gun II Laser Beam Torpedo Level" brochure (PR 257), Waukesha, WI (1997) 2 pages.

*Primary Examiner*—Georgia Epps
*Assistant Examiner*—Ricky Mack
*Attorney, Agent, or Firm*—Skjerven, Morrill, MacPherson, Franklin& Friel LLP; John T. Winburn

[57] ABSTRACT

An improved laser adjustment mechanism providing precision alignment of the laser in two dimensions. The mechanism includes a pair of biased threaded mechanisms orthogonally captured by a laser module, which are adjustable to pivot the laser in a plane substantially even with the plane of the laser light emission. The threaded mechanisms are adjustable from the exterior of the level and can precisely align the laser device by placing the device on a surface. A first laser spot is measured at a distant plane, then the device is turned over on the same surface and a second target spot is measured on the same plane. The laser is adjusted half way between the two target spots to precisely align the pitch of the device. The device then can be turned on the side to align the yaw of the device.

24 Claims, 9 Drawing Sheets

FIG. 7C

LASER ADJUSTMENT MECHANISM

BACKGROUND

1. Field of the Invention

The present invention relates generally to laser leveling devices, including a laser and in particular to a mechanism for adjusting the laser in two dimensions.

2. Description of Related Art

The utilization of a laser in combination with a level, either the traditional bubble type or electronic, is well known. Generally, these devices include either a laser which has been factory adjusted during manufacture of the devices and can be readjusted by the manufacturer or is permanently potted or otherwise sealed to prevent adjustment. To maintain a precise laser alignment in the field, such as after dropping the device or temperature changes or other factors, it would be desirable to be able to adjust the laser in the field.

One type of level, including a laser, is manufactured by Empire Level Mfg. Corp. of Waukesha, Wisconsin. One so-called "torpedo" type laser level, sold under the name "Top Gun II" includes "factory set adjustment screws". These set screws are not intended for field alignment.

A second "torpedo" type laser level is manufactured by Checkpoint of Torrance, Calif., sold under the name "Checkpoint 8-80". This device includes instructions to send it to the factory when misaligned. Alternately, the level can be set upside down and realigned on a "known level mark approximately 10 feet away, using the three set screws (located on the side and bottom of the level) manipulate left, right, up and down to aligned mark. Tighten or snug the three set screws evenly when aligned."

It would be desirable to precisely align the laser in the field in two dimensions in a noncomplex manner, without returning the device to the manufacturer.

SUMMARY

An improved laser adjustment mechanism providing precision alignment of the laser in two dimensions. The mechanism includes a pair of biased threaded mechanisms orthogonally captured by a laser module, which are adjustable to pivot the laser in a plane substantially even with the plane of the laser light emission. The threaded mechanisms are adjustable from the exterior of the level and can precisely align the laser device by placing the device on a surface. A first laser spot is measured at a distant plane, then the device is turned over on the same surface and a second target spot is measured on the same plane. The laser is adjusted half way between the two target spots to easily and precisely align the pitch of the device. The device then can be turned on the side to align the yaw of the device in the same manner.

BRIEF DESCRIPTION OF DRAWINGS

Utilization of the same reference numerals in different FIGURES indicates similar or identical elements, structurally and/or functionally.

DETAILED DESCRIPTION OF THE PREFERRED EMBODIMENT

Figure 1:
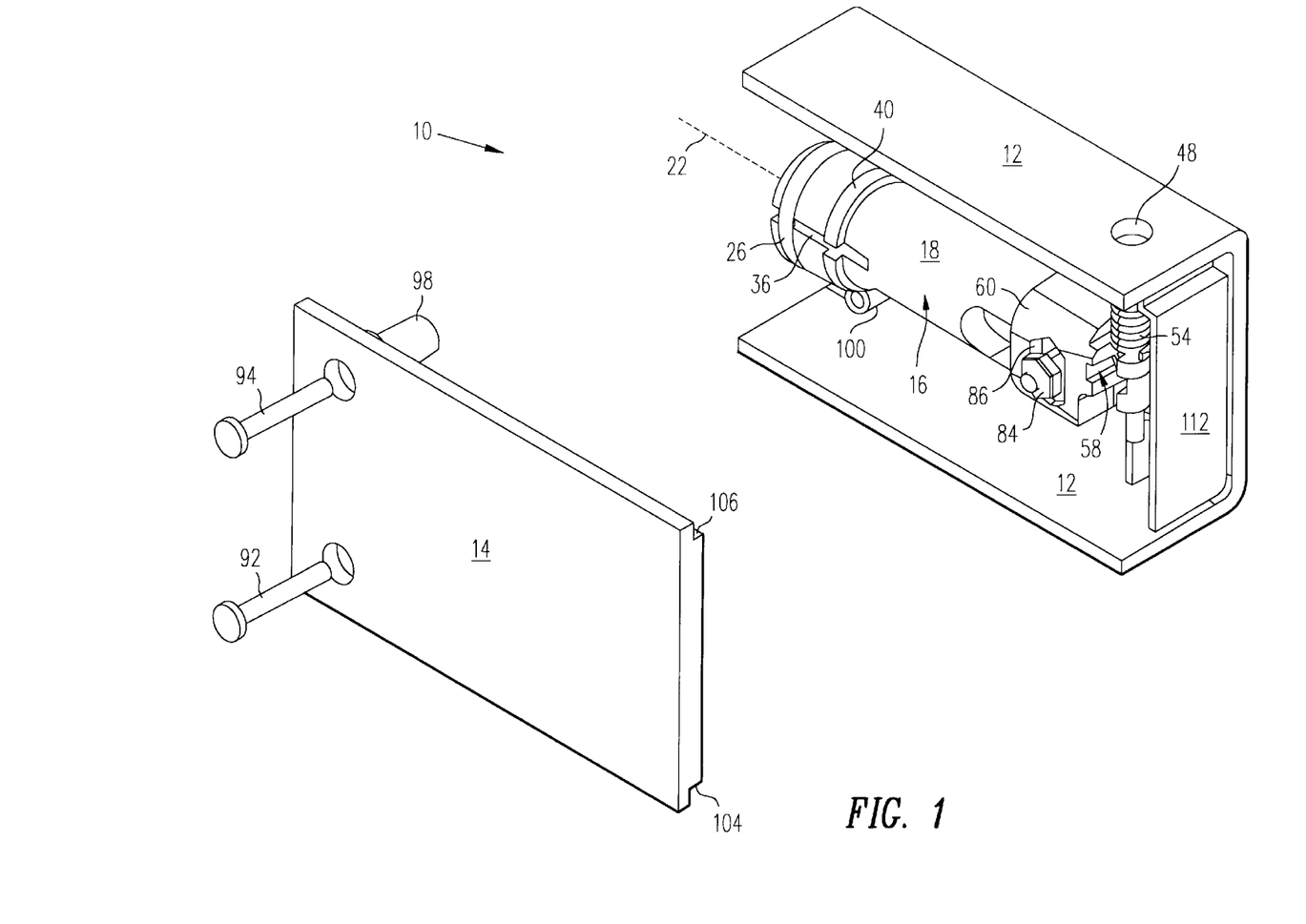
FIGS. 1 and 2 are orthogonal perspective views of one embodiment of the laser adjustment mechanism of the present invention.
Figure 2:
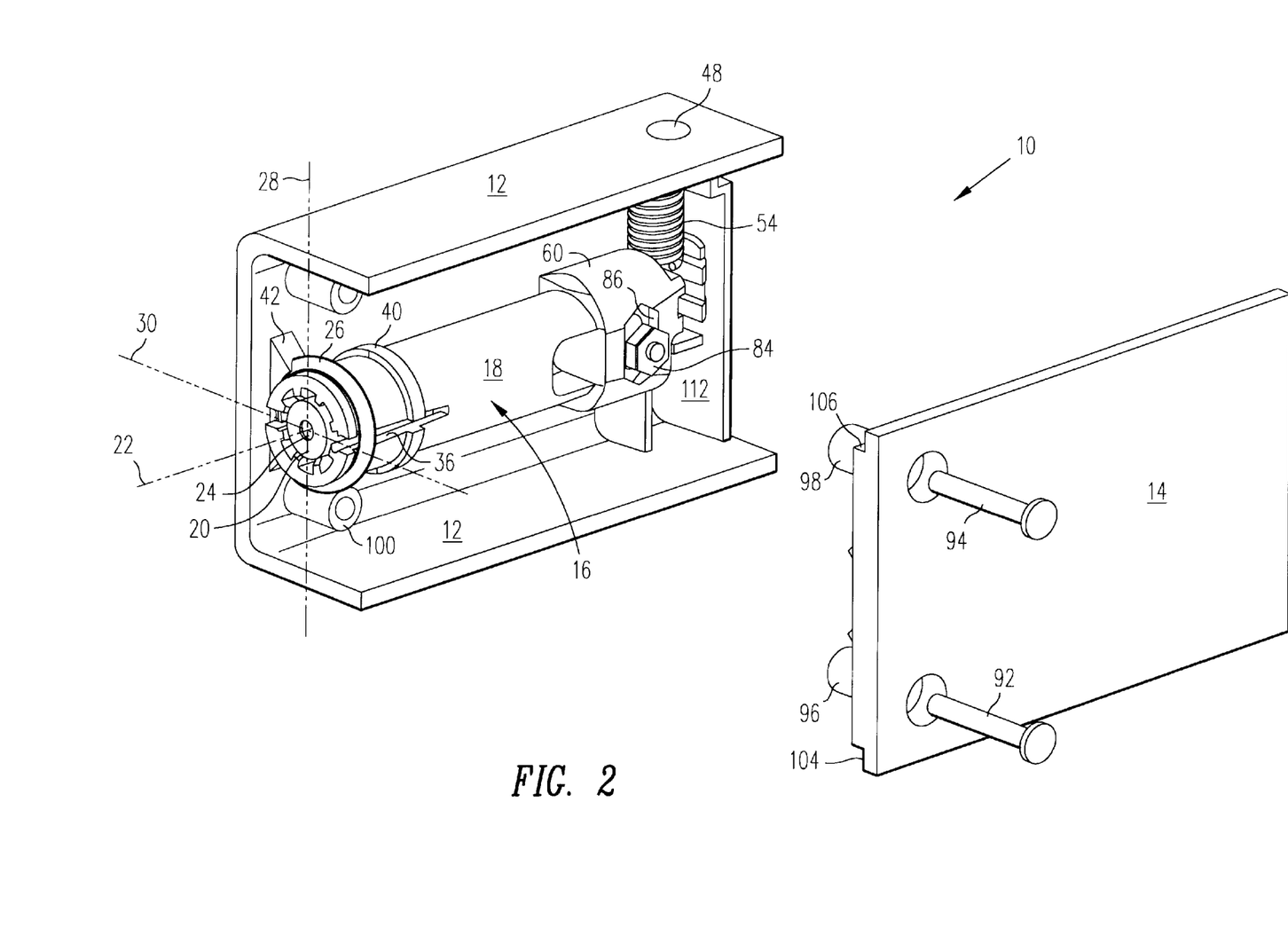

In accordance with one embodiment of the present invention, a laser adjustment mechanism is designated generally by the reference numeral 10 in FIGS. 1 and 2. The mechanism 10 includes a first or main housing 12 and a rear housing or plate 14. A laser module 16 includes a housing or body 18 which is pivotally mounted in the housing assembly formed by the housing 12 and the plate 14.

The module 16 has a laser diode 20 mounted therein. The laser diode 20 generates a laser beam 22 from a lens 24. The module 16 is adjustably mounted in the housing 12, 14 by a resilient or elastomeric O-ring 26 to pivot substantially in the plane of the lens 24. This allows the laser beam 22 to be adjusted along a yaw or vertical axis 28 and a pitch or horizontal axis 30 orthogonal to the axis 28, without substantial movement of the lens 24. This is important, because the module 16 is mounted in the housing 12, 14, such that the axis of the laser beam 22 is aligned half way between the vertical and horizontal exterior surfaces of the housing 12, 14.

Figure 3:
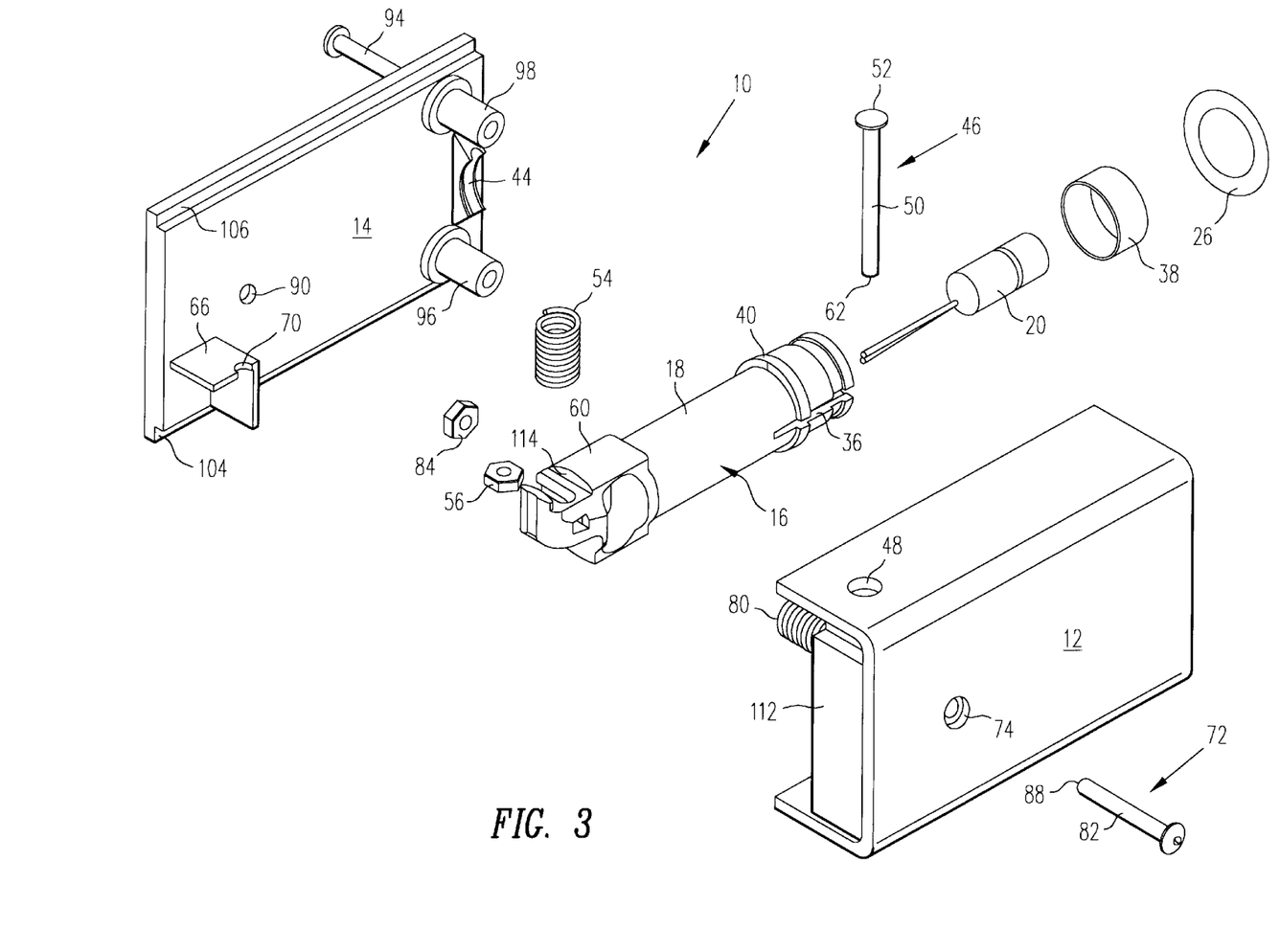
FIGS. 3 and 4 are orthogonal exploded perspective views of the mechanism of FIGS. 1 and 2.
Figure 4:
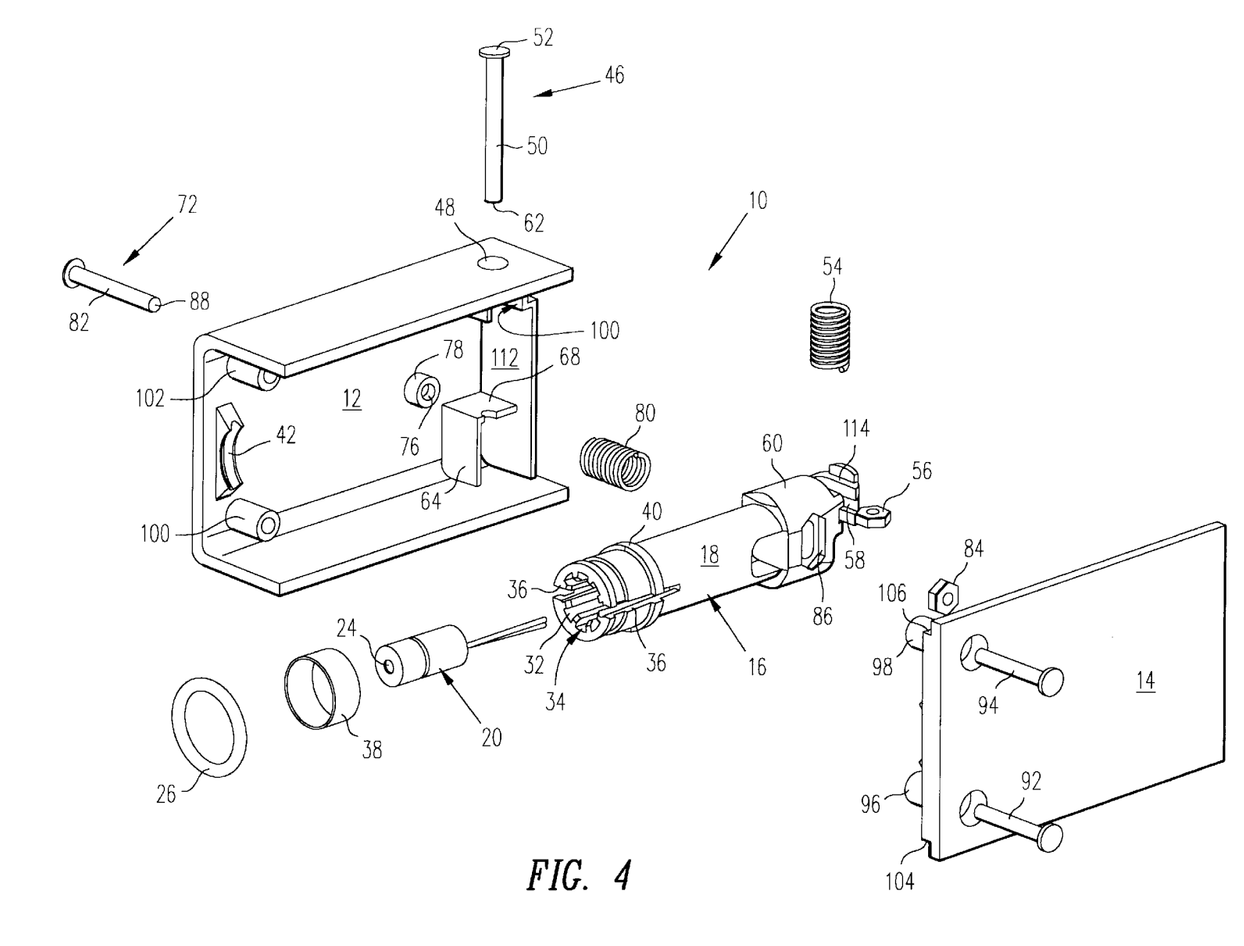

The details of the laser adjustment mechanism 10 are best illustrated in FIGS. 3 and 4. The module body 18, preferably is molded from a plastic material, and includes a hollow interior 32 having an opening 34. The hollow interior 32 is dimensioned to be about the same size or slightly smaller than the exterior dimension of the laser diode 20. The body 18 further includes a pair of slots 36 adjacent the opening 34, which open into the hollow 32.

The laser diode 20 is inserted into the interior 32 of the body 18 through the opening 34. The laser diode 20 then is securely retained in the body 18 by tension if the hollow is the same or somewhat smaller than the laser diode 20, but preferably also by a metal retaining ring 38. The retaining ring 38 is forced over the outside of the body 18 against a ridge or shoulder 40 formed on the exterior of the body 18.

The O-ring 26 then is mounted over the exterior of the body 18, closely adjacent the plane of the lens 24. The housing elements 12, 14 have respective raised grooves 42, 44 formed or molded therein on the interior of the housing 12,14. When the housing elements 12, 14 are mounted together, the O-ring 26 is mounted in the grooves 42, 44. This captures the body 18 but allows some vertical or horizontal movement, while acting as a flexible pivot point for the laser module 16.

The vertical or axis alignment is provided by a vertical adjustment bolt or screw 46. The screw 46, which can be actuated by a slotted or Phillips head screw driver, preferably is precisely actuated by an Allen wrench (not illustrated). The screw 46 is inserted in and accessed through an aperture 48. The aperture 48 is sized such that the threaded shaft 50 passes through the aperture 48, but the screw head 52 is preferably only seated therein or thereon in a counterbore, below the housing surface.

The screw 46 is mounted through a spring 54 and then rotatably through a nut 56. The nut 56 is non-rotatably captured in an elongated slot 58 molded into a rear end 60 of the body 18. The bottom end 62 of the screw 46 is captured by a pair of ribs or flanges 64, 66 formed with or on the respective housing elements 12, 14. Preferably, the flanges 64, 66, include a recess or notch 68, 70. This capture structure allows the screw 46 to provide vertical movement in either direction but prevents horizontal movement thereof.

Adjustment along the horizontal or pitch axis 30 is provided by a screw or bolt 72. The screw 72 operates essentially the same as the screw 46, only in a horizontal direction. The screw 72 is inserted and accessed through an aperture 74 which also forms part of or is aligned with a passageway 76 in an internal hollow post 78. The post 78 provides a mount for a spring 80, through which the screw 72 is inserted.

The screw 72 includes a threaded shaft 82, which is threaded through a nut 84. The nut 84 is non-rotatably captured in a mating elongated recess or slot 86 in the body 18. A free end 88 of the screw 72 is captured in a recess 90 formed in an inside wall of the housing 14. Like the related vertical screw assembly of the screw 46, the screw assembly of the screw 72 provides horizontal movement without vertical movement. Also with the spring 80 and the captured nut 84, each portion of the screw assembly is maintained once adjusted.

The laser adjustment mechanism 10 then is finally assembled with the housing members 12, 14 secured together by pairs of bolts or screws 92, 94 (only two of which are illustrated). The screws 92, 94 preferably are inserted through a respective mounting post 96, 98 and into a mating threaded post 100, 102. The housing 14 preferably includes a pair of beveled or stepped edges 102, 104 to provide a secure alignment for the assembled housing 12, 14.

Figure 5A:
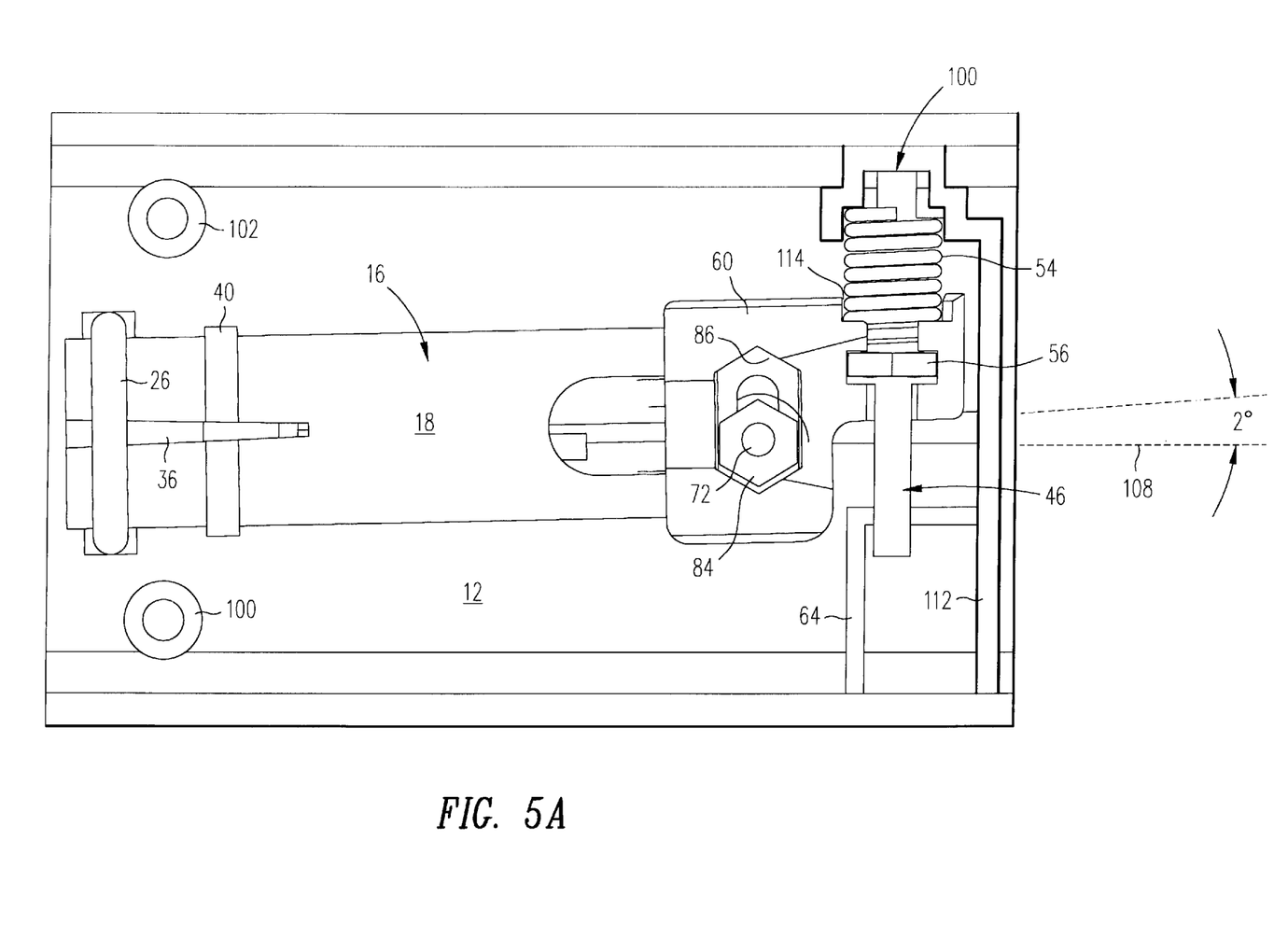
FIGS. 5A, 5B and 5C are side views of the pitch alignment of the mechanism of FIGS. 1 and 2.
Figure 5B:
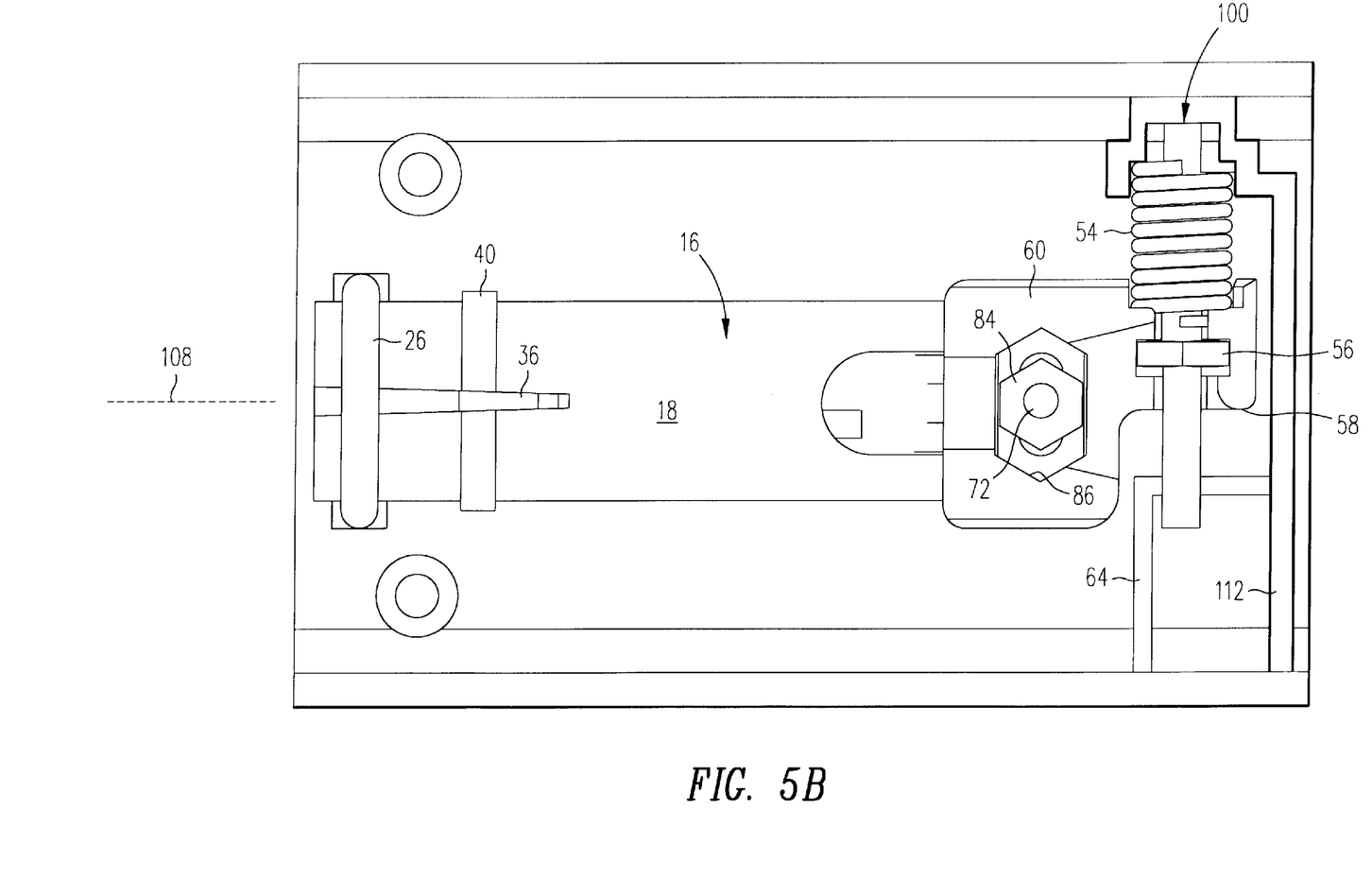
Figure 5C:
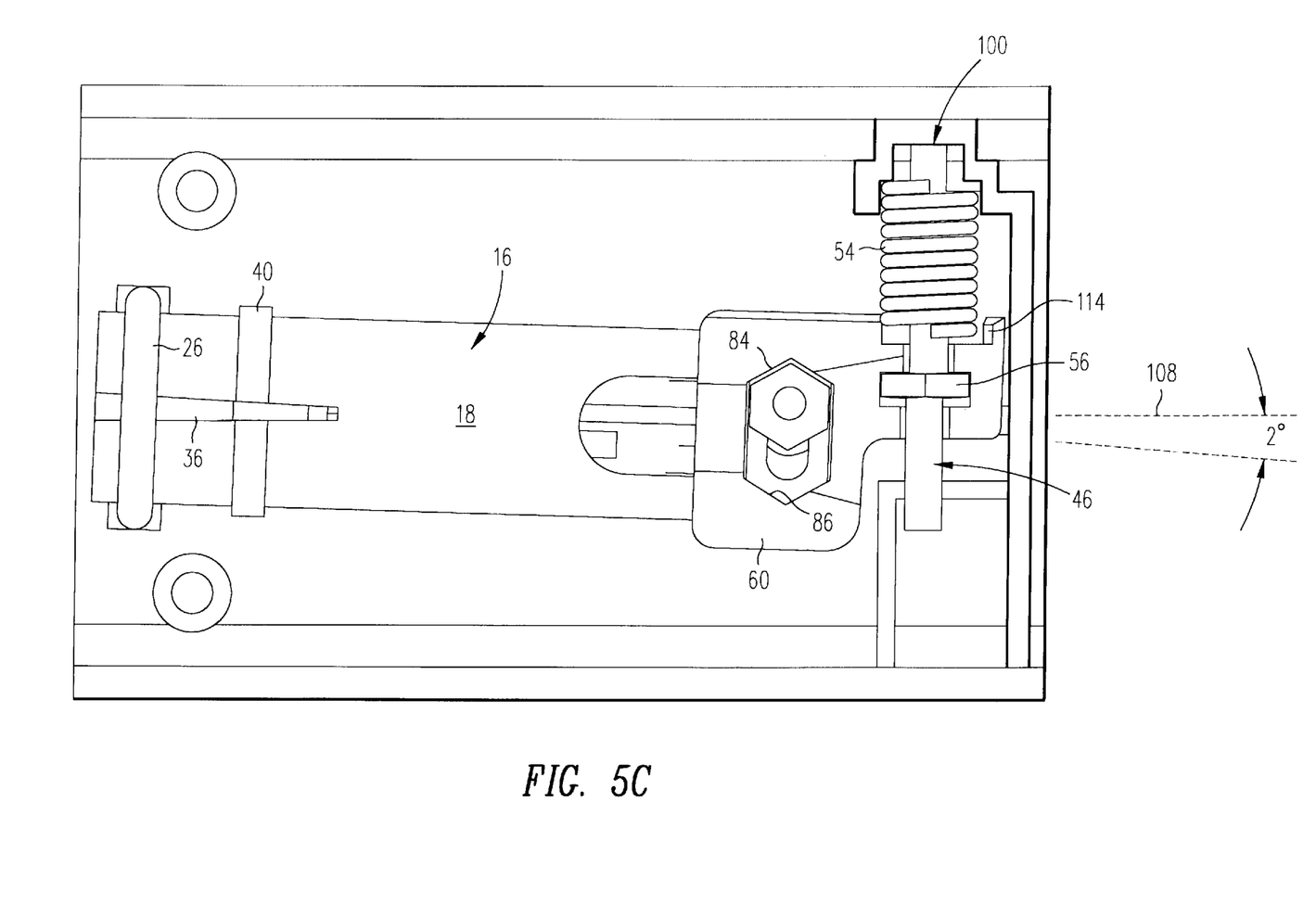

The laser adjustment mechanism 10 then is mounted together and can be vertically adjusted as illustrated in FIGS. 5A–5C. The side views in FIGS. 5A–5C are like the views of the housing 12 and the module 16 in FIG. 2, without the housing 14. The laser module 16 is aligned with a horizontal axis 108 in FIG. 5B. Note, the elongated recess 86 allows the body 18 to move vertically since the nut 84 is horizontally fixed on the screw 70. The axis 60 of the module 16 can be moved up (FIG. 5A) or down (FIG. 5C) as necessary or desired. The laser beam can be moved a few degrees up or down (illustrated as two (2)) to change the pitch of the module 16. The module 16 is pivoted around the O-ring 26.

Also, as illustrated in FIGS. 5A–5C, one end of the spring 54 can be captured in a retainer socket 110 formed in or secured to the housing 12. The socket 110 also can be formed with or secured to an end wall 112. The end wall 112 closes the laser adjustment mechanism 10 off from the rest of a device in which the laser adjustment mechanism 10 is mounted or forms a portion of. The flange 64 also can be formed with or secured to the wall 112. The other end of the spring 54 can be seated in a socket 114 formed in the end 60 of the body 18.

Figure 6:
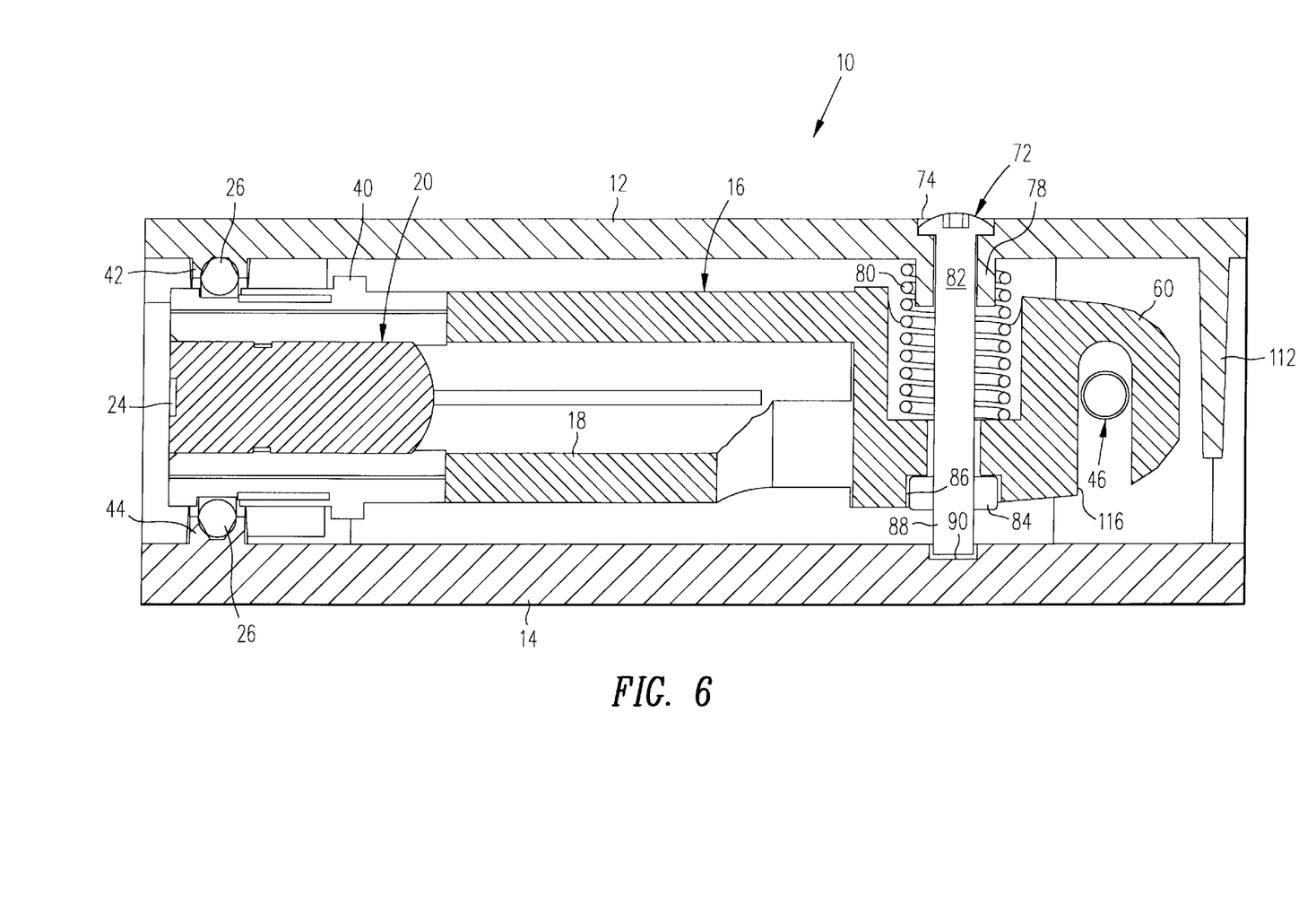
FIG. 6 is a top sectional view of the mechanism of FIGS. 1 and 2.

FIG. 6 is a top view, partially in section, of the assembled laser adjustment mechanism 10. Like the vertical view and movement illustrated in FIGS. 5A–5C, the horizontal movement of the module 16 requires movement relative to the vertical screw 46. As the horizontal screw 72 is adjusted to move the module body 18, the rear 60 of the body 18 can move laterally past the screw 46 by a slot 116.

Figure 7A:
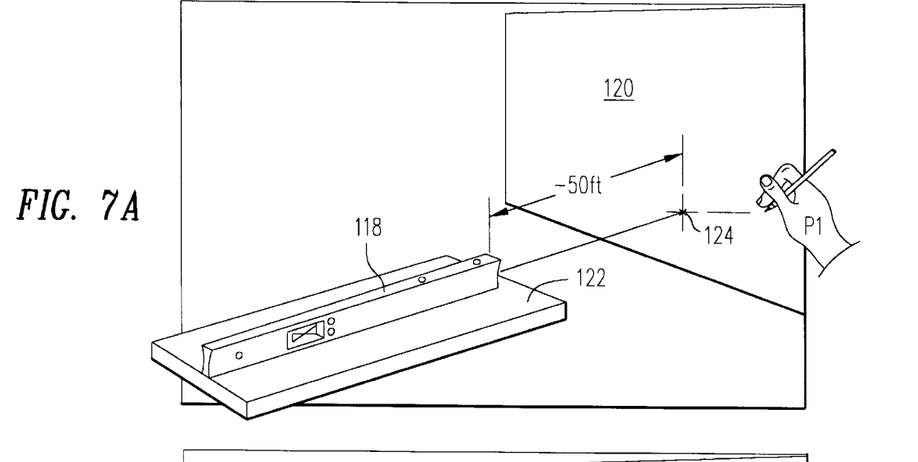
FIGS. 7A, 7B and 7C are perspective views of the pitch alignment of the mechanism of FIGS. 1 and 2.
Figure 7B:
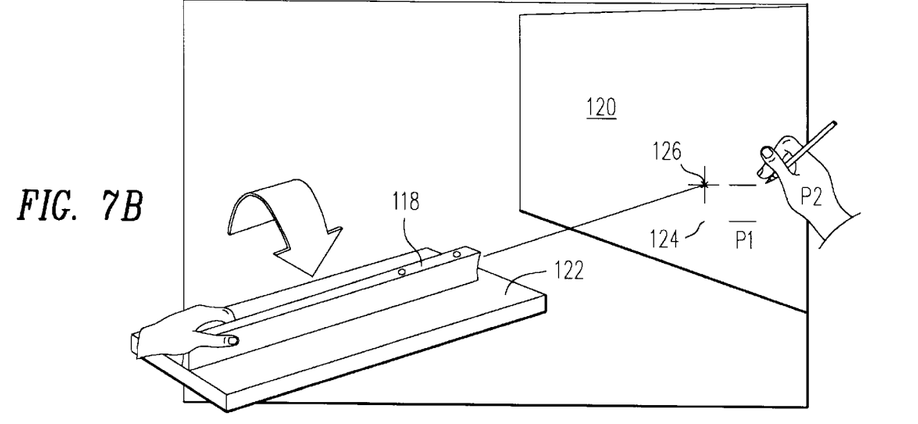
Figure 7C:
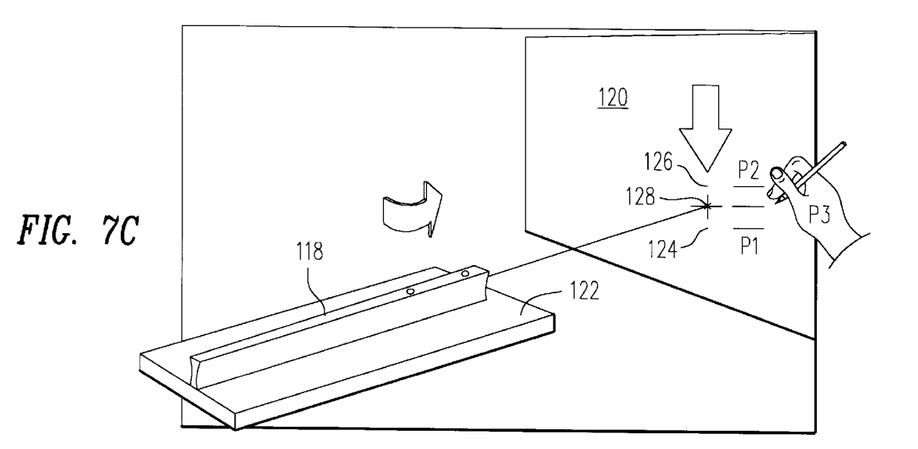

Utilization and alignment of the laser adjustment mechanism 10 in a device, such as a level 118, is illustrated in FIGS. 7A–7C. The laser beam 22 is aimed at a surface 120 at an appropriate distance, such as about fifteen (15) meters (FIG. 7A). The level 118 can be placed in a first position on a board or other surface 122 to aim the beam 22 at a first point 124 (P1). This first point 124 can be marked by a user on the surface 120. The laser level 118 then is turned over on the surface 122 (FIG. 7B) and replaced in the same location on the surface 22. The beam 22 then is directed to a second point 126 (P2) on the surface 120. The beam 22 then is adjusted, such as by the screw 46 to an aligned or calibration point 128 which is midway between the two points 124 and 126. The level 118 then can be turned over again to confirm the pitch is correctly aligned.

In a like manner, the level 118 then can be placed on its side and the screw 72 can be adjusted to align the yaw axis of the module 16. In this embodiment, the housing portions 12 and 14 preferably would be part of the exterior casing of the level 118.

Although the present invention has been described with reference to particular embodiments, the described embodiments are examples of the present invention and should not be taken as limitations. Although the screw adjustment mechanisms 46 and 72 have been illustrated, the invention can be practiced by other equivalent adjusting structures. This could include structures or bolts which are mounted and rotate between opposite housing walls with the nuts 56 and 84 moveable laterally on the bolts. In this case, the nuts 56 and 84 both could be captured in the module body 18, such as by slots, like the slot 58 or again could be biased by springs to provide the back and forth movement of the module 16. Also although the coil springs 54 and 80 form one preferred embodiment, other biasing mechanisms could be utilized. This could include leaf springs, which could be mounted in or molded with the housing 12. The O-ring 26 could be replaced by another elastomeric member or members (not illustrated), which could be mounted on or secured to the body 18. Some lateral movement is allowed by the O-ring 26, which can move on the body 18, as the module 16 is pivoted. This lateral movement could be provided by the grooves 42, 44, which then could be widened into slots to allow the member secured to the body 18 the required lateral movement. As will be appreciated by those skilled in the art, various other adaptations and combinations of the embodiments described herein are within the scope of the present invention as defined by the attached claims.

We claim:

1. A laser adjustment mechanism for adjusting or calibrating a laser device, comprising:

a laser module mounted in a housing including a laser in said module having a lens in a front end of said module;

means for forming a pivot plane for said module adjacent said lens; and means for adjusting a rear end of said module both in a first axis and in a second axis orthogonal to said first axis.

2. The mechanism of claim 1, including means for biasing said adjusting means in said first and second axis to maintain an adjusted position.

3. The mechanism of claim 1, including said module including an opening in said module front end and a slot each side of said opening and said laser mounted in said opening.

4. The mechanism of claim 3, including said module including a retaining ring mounted over said front end of said module and said slots securing said laser in said module.

5. The mechanism of claim 1, including said pivot plane means including a resilient ring mounted over said module substantially in said pivot plane, said ring fixedly secured in said housing.

6. The mechanism of claim 5, including said ring clamped between opposite side retaining grooves in said housing.

7. The mechanism of claim 1, including said adjustment means including threaded means captured in said housing and said module rear end in said first and second axis and each said threaded means adjustable independently to move said module rear end substantially in a respective axis.

8. The mechanism of claim 7, included each said threaded means including a nut captured in said module rear end and a screw threaded through the nut and adjustable through said housing to move said module rear end substantially in a respective one of said axes.

9. The mechanism of claim 8, said screw captured in said housing and said nut captured in said module in a slot to allow module movement in said orthogonal axis without substantial movement of said screw in said respective axis.

10. The mechanism of claim 7, including means for biasing each said threaded means in the respective axis to maintain an adjusted position.

11. The mechanism of claim 10, including said biasing means including a spring mounted over said threaded means and bearing between said housing and said module rear end.

12. The mechanism of claim 1, including said housing forming a portion of a level.

13. A laser adjustment mechanism for adjusting or calibrating a laser device, comprising:
 a laser module mounted in a housing including a laser in said module having a lens in a front end of said module;
 said module front end mounted in a pivot plane formed in said housing for said module adjacent said lens; and
 a threaded assembly for adjusting a rear end of said module both in a first axis and in a second axis orthogonal to said first axis.

14. The mechanism of claim 13, including a biasing member biasing said threaded assembly in said first and second axis to maintain an adjusted position.

15. The mechanism of claim 13, including said module including an opening in said module front end and a slot in each side of said opening and said laser mounted in said opening.

16. The mechanism of claim 15, including said module including a retaining ring mounted over said front end of said module and said slots securing said laser in said module.

17. The mechanism of claim 13, including said pivot plane including a resilient ring mounted over said module substantially in said pivot plane, said ring fixedly secured in said housing.

18. The mechanism of claim 17, including said ring clamped between opposite side retaining grooves formed in said housing.

19. The mechanism of claim 13, including a threaded assembly captured in said housing and said module rear end in each of said first and second axis and each said threaded assembly adjustable independently to move said module rear end substantially in a respective axis.

20. The mechanism of claim 19, included each said threaded assembly including a nut captured in said module rear end and a screw threaded through the nut and adjustable through said housing to move said module rear end substantially in a respective one of said axes.

21. The mechanism of claim 20, said screw captured in said housing and said nut captured in said module in a slot to allow module movement in said orthogonal axis without substantial movement of said screw in said respective axis.

22. The mechanism of claim 19, including a biasing member biasing each threaded assembly in said respective axis to maintain an adjusted position.

23. The mechanism of claim 22, including said biasing member including a spring mounted over said threaded assembly and bearing between said housing and said module rear end.

24. The mechanism of claim 13, including said housing forming a portion of a level.

* * * * *